(12) United States Patent
Chehaiber

(10) Patent No.: US 11,385,184 B2
(45) Date of Patent: Jul. 12, 2022

(54) SYSTEM AND METHOD FOR OPTICAL INSPECTION OF AN OBJECT

(71) Applicant: IVISYS SWEDEN AB, Vällingby (SE)

(72) Inventor: Moatasem Chehaiber, Hvidovre (DK)

(73) Assignee: IVISYS SWEDEN AB, Vällingby (SE)

( * ) Notice: Subject to any disclaimer, the term of this patent is extended or adjusted under 35 U.S.C. 154(b) by 0 days.

(21) Appl. No.: 16/758,269

(22) PCT Filed: Oct. 19, 2018

(86) PCT No.: PCT/SE2018/051068
§ 371 (c)(1),
(2) Date: Apr. 22, 2020

(87) PCT Pub. No.: WO2019/083429
PCT Pub. Date: May 2, 2019

(65) Prior Publication Data
US 2020/0340929 A1    Oct. 29, 2020

(30) Foreign Application Priority Data
Oct. 26, 2017   (SE) .................................. 1751327-6

(51) Int. Cl.
*G01N 21/88*   (2006.01)
*G01N 21/89*   (2006.01)
(Continued)

(52) U.S. Cl.
CPC ......... *G01N 21/8806* (2013.01); *G01N 21/89* (2013.01); *G03B 15/02* (2013.01);
(Continued)

(58) Field of Classification Search
CPC .............. G01N 21/8806; G01N 21/89; G01N 2021/845; G01N 2021/8835;
(Continued)

(56) References Cited

U.S. PATENT DOCUMENTS

| 6,627,863 B2 | 9/2003 | Wasserman |
| 2003/0218688 A1* | 11/2003 | Shaw ................... H04N 5/2256 348/370 |

(Continued)

FOREIGN PATENT DOCUMENTS

| DE | 19911896 A1 | 11/1999 |
| EP | 2801815 A1 | 11/2014 |

(Continued)

OTHER PUBLICATIONS

PCT International Search Report and Written Opinion dated Dec. 10, 2018 for International Application No. PCT/SE2018/051068, 10 pages.

(Continued)

*Primary Examiner* — Jamil Ahmed
(74) *Attorney, Agent, or Firm* — RMCK Law Group, PLC

(57) ABSTRACT

The present disclosure generally relates to a system for optical inspection of an object, specifically comprising an illumination assembly operated to provide homogeneous illumination of the object, thereby improving the overall accuracy of the optical inspection. The optical vision system also comprises an image sensor configured to capture an image of the object and a control unit in electrical communication with and configured to operate the image sensor and the illumination assembly, wherein the control unit is configured to automatically control the illumination assembly to illuminate the object with a predetermined illumination pattern based on a selected object type. The present disclosure also relates to a corresponding method and to a computer program product.

18 Claims, 5 Drawing Sheets

(51) Int. Cl.
*G03B 15/02* (2021.01)
*H05B 47/105* (2020.01)
*G06T 7/00* (2017.01)
*H04N 5/235* (2006.01)
*G01N 21/84* (2006.01)

(52) U.S. Cl.
CPC ......... *G06T 7/0004* (2013.01); *H04N 5/2354* (2013.01); *H05B 47/105* (2020.01); *G01N 2021/845* (2013.01); *G01N 2021/8835* (2013.01); *G01N 2201/062* (2013.01); *G01N 2201/0633* (2013.01); *G06T 2207/30168* (2013.01)

(58) Field of Classification Search
CPC ..... G01N 2201/062; G01N 2201/0633; H05B 47/105; G03B 15/02; G06T 7/0004; G06T 2207/30168; H04N 5/2354
See application file for complete search history.

(56) References Cited

U.S. PATENT DOCUMENTS

| | | |
|---|---|---|
| 2010/0098400 A1 | 4/2010 | Chen et al. |
| 2014/0146318 A1 | 5/2014 | Hu et al. |
| 2014/0168508 A1 | 6/2014 | Nunnink et al. |
| 2016/0127631 A1 | 5/2016 | Terada et al. |

FOREIGN PATENT DOCUMENTS

| | | |
|---|---|---|
| WO | 0201210 A1 | 1/2002 |
| WO | 2017080875 A1 | 5/2017 |

OTHER PUBLICATIONS

Extended European Search Report dated May 14, 2021 for EP Application No. 18871284.8, 9 pages.

\* cited by examiner

SYSTEM AND METHOD FOR OPTICAL INSPECTION OF AN OBJECT

CROSS-REFERENCE TO RELATED APPLICATIONS

This application is a 371 U.S. National Stage of International Application No. PCT/SE2018/051068, filed Oct. 19, 2018, which claims priority to Swedish Patent Application No. 1751327-6, filed Oct. 26, 2017. The disclosures of each of the above applications are incorporated herein by reference in their entirety.

TECHNICAL FIELD

The present disclosure generally relates to a system for optical inspection of an object, specifically comprising an illumination assembly operated to provide homogeneous illumination of the object, thereby improving the overall accuracy of the optical inspection. The present disclosure also relates to a corresponding method and to a computer program product.

BACKGROUND

Various types of vision systems have been proposed for automated inspection of an object. These systems are typically based around the use of an image sensor, which acquires images of the object, and processes these acquired images using a control unit, such as a microprocessor. The ability to detect defects in a quick and reliable manner can be strongly affected by the quality of illumination of the object under inspection. Both the intensity and the symmetry of the illumination can be important in this regard. For this reason, such a system commonly uses multiple light sources with various types of illumination optics.

An exemplary implementation of such a system is disclosed in US20140168508, comprising an illumination assembly including a plurality of LEDs for appropriate illumination of the object. According to US20140168508, different types of illumination assemblies may be affixed with the vision system, where the structure of the different types of illumination assemblies is dependent on the features of the object that is to be imaged.

Even though US20140168508 introduces an interesting approach to solving the above-mentioned problems with achieving appropriate illumination of an object to be imaged, the proposed idea with interchangeable illumination assemblies will provide a somewhat cumbersome user operation of the vision system. That is, the user has to keep track on all of the different illumination assemblies and be sure to apply the correct type of illumination assembly depending on the type of object to be imaged. In addition, as only a limited number of different types of illumination assemblies, realistically and from a cost perspective, will be readily available during inspection, there is a risk that the actual illumination provided is not completely targeting the actual type of object being inspected.

Based on the above, there appears to be room for further improvement in regards to means for achieving appropriate illumination of an object to be inspected using an automated vision system, for example improving usability and providing a high level of adaptability to the type of object being inspected.

SUMMARY

In view of above-mentioned and other drawbacks of the prior art, it is an object of the present disclosure to provide an improved optical inspection system, making use of a controllable illumination assembly for illumination of an object to be inspected.

According to an aspect of the present disclosure, it is therefore provided an optical vision system for automated inspection of an object, the system comprising an image sensor configured to capture an image of the object, a controllable illumination assembly configured to illuminate the object, the illumination assembly comprising a plurality of individually controllable light sources positioned to surround the image sensor, and a control unit in electrical communication with and configured to operate the image sensor and the illumination assembly, wherein the control unit is configured to automatically control the illumination assembly to illuminate the object with a predetermined illumination pattern based on a selected object type, acquire a first image of the object using the image sensor, determine an illumination quality metric based on the first image, determine, if the determination of the illumination quality metric indicates that the illumination quality metric is below a predetermined threshold, an adapted illumination pattern based on the illumination quality metric, and control the illumination assembly to illuminate the object with the adapted illumination pattern.

It is, as indicated above, well known that an adequate level of illumination is necessary to be able to acquire high quality images for use in relation to automated inspection of an object. Prior solutions for providing such an adequate level of illumination has relied on the use of specialized (different) illumination assemblies dependent on e.g. the type of object or feature of an object that is to be inspected. The present disclosure is based upon the realization that adequate illumination may be provided in relation to different types of e.g. objects using the same type of illumination assembly, as long as an illumination pattern formed by such an illumination assembly may be adapted to match the object type.

In accordance to the present disclosure, different illumination patterns may for example be predetermined for different object types, and the predetermined illumination pattern is then used as a starting point when illuminating the object for automated inspection of the object. In addition, the inventor has identified that there may be necessary to allow the illumination pattern to be dynamically adjusted to achieve the mentioned high quality image. Thus, in accordance to the present disclosure an illumination quality metric is determined based upon an initially acquired image (such as the first image) of the object. The illumination quality metric is then compared to a predetermined threshold, possibly related to the object type, for determining if the initially acquired is "good enough". Furthermore, the inventor has identified that different objects preferably are to be illuminated differently for achieving a high quality image of the object, to be used in a further inspection of the object. The predetermined illumination pattern for a specific object may thus e.g. be dependent on the external structure of the object (e.g. coating, glare, etc.), a useful distance of the object (e.g. in comparison to the position of the image sensor), etc.

If this is the case, the initially acquired image (and further acquired images) may be used in the automated inspection of the object. However, in case the illumination quality metric is determined to be below the threshold (i.e. "not good enough") then the illumination pattern may be adjusted. The adjustment may possibly be performed more than once with the desire to increase the illumination quality metric (in further acquired images), at least until the illumination quality metric is above the predetermined threshold.

In accordance to an embodiment of the present disclosure, the step of determining the image quality metric may comprise determining a level of homogeneous light distribution throughout a selected field of view within the captured image. Accordingly, the acquired initial image (or further images in case of further determinations of the illumination quality metric) may thus for example be analyzed to determine the level of homogeneous light distribution in at least an area in the vicinity of the object (as shown in the acquired image). Within the context of the present disclosure the expression homogeneous light distribution should be understood to relate to the provision of an essentially equal light intensity level within the selected field of view.

Preferably, the step of determining the adapted illumination pattern comprises determining a level of accommodation with the Lambert's Cosine Law with respect to the object and the light illuminated by the illumination assembly. With relation to the present disclosure, the concept of Lambert's Cosine Law generally means that e.g. a surface of the object to be inspected is determined to have the same radiance when viewed from any angle. Put differently, to the human eye the total surface of the object will in the ideal case have the same apparent brightness (or luminance). Accordingly, in determining the level of accommodation with the Lambert's Cosine Law it is thus possible to further determine "how well" the object is illuminated. In accordance to the present disclosure, this measure may also be used for optimizing the illumination pattern emitted towards the object.

In a possible embodiment of the present disclosure, the step of determining the adapted illumination pattern comprises determining a level of accommodation with the Inverse Square Law with respect to the object and the light illuminated by the illumination assembly. With relation to the present disclosure, the concept of determining the level of accommodation with the Inverse Square Law means determining "how well" the intensity from the illumination assembly is distributed over the object, wherein the intensity from the illumination assembly in the ideal case will be inversely proportional to the square of the distance from the illumination assembly. In accordance to the present disclosure, this measure may also be used for optimizing the illumination pattern emitted towards the object.

In a preferred embodiment of the present disclosure, each light source of the illumination assembly comprises at least one light emitting diode (LED). LEDs are typically selected due to the in comparison high controllability of such light sources, combined with an in comparison high energy efficiency. It should however be understood that it may be possible to instead use e.g. gas discharge elements, incandescent bulbs, fluorescent bulbs, or the like as at least one of the light sources. Each of the LEDs may additionally be provided with an optical lens, for example for focusing or defocusing the light emitted by the LED. The purpose with the optical lens may be selected dependent on the application at hand and/or the type of object to be inspected.

Preferably, the control unit may be further configured to acquire a second image of the object using the image sensor, and to determine an inspection parameter for the object. Accordingly, once the control unit has determined that the adequate amount and quality of light is emitted in a direction towards the object to be inspected, the image sensor may acquire further images to be used in the automated inspection process as discussed above. The inspection process may for example involve performing image processing based on the acquired images for determining different parameters for the object being inspected. Such an inspection parameter may for example relate to distance measure for a portion of the objection, for example for determining a tolerance level for that portion of the object. Further parameters and determinations may be made, being within the scope of the present disclosure and known to the person skilled in the art.

In a preferred embodiment of the present disclosure, the light sources of the illumination assembly are symmetrically arranged surrounding the image sensor. Such a configuration may advantageously allow for further improvements to achieving the desired homogeneous illumination of the object to be inspected. Possibly, the light sources may be arranged in a ring formation surrounding the image sensor, as will be further discussed below.

In accordance to the above, it may be preferred to allow the predetermined illumination pattern to comprise control parameters for individually controlling the plurality of light sources of the illumination assembly. Consequently, the position of the different light sources in relation to the image sensor as well as in relation to the object to be inspected may be taken into account for setting the individual control parameters. In a preferred embodiment the individual control parameters may at least comprise an intensity level for each of the light sources of the illumination assembly. It may of course also be possible to control a color (wavelength) of light emitted by the individual light sources.

Furthermore, the control parameters for individually controlling the plurality of light sources of the illumination assembly are pre-simulated for the specific type of object to be inspected, as was indicated above.

According to another aspect of the present disclosure, there is provided a method for operating an optical vision system for automated inspection of an object, the system comprising an image sensor configured to capture an image of the object, a controllable illumination assembly configured to illuminate the object, the illumination assembly comprising a plurality of individually controllable light sources positioned to surround the image sensor, and a control unit in electrical communication with and configured to operate the image sensor and the illumination assembly, wherein the method comprises controlling the illumination assembly to illuminate the object with a predetermined illumination pattern based on a selected object type, acquiring a first image of the object using the image sensor, determining an illumination quality metric based on the first image, determining, if the determination of the illumination quality metric indicates that the illumination quality metric is below a predetermined threshold, an adapted illumination pattern based on the illumination quality metric, and controlling the illumination assembly to illuminate the object with the adapted illumination pattern. This aspect of the present disclosure provides similar advantages as discussed above in relation to the previous aspect of the present disclosure.

In a preferred embodiment of the present disclosure the method may further comprise, prior to controlling the illumination assembly to illuminate the object with the predetermined illumination pattern, simulating an illumination pattern for illumination of the object, optimizing, in simulation, the illumination pattern for maximizing a level of homogeneous light distribution of the object, and selecting the predetermined illumination pattern. Thus, as indicated above it may be advantageous and improve the illumination pattern to allow for a "object type" based simulation (and/or testing) of the predetermined illumination pattern for optimizing the "staring point" of the illumination pattern used for illuminating the object, possibly include determining individual control parameters (including intensity) for the plurality of light sources.

According to a further aspect of the present disclosure there is provided a computer program product comprising a non-transitory computer readable medium having stored thereon computer program means for operating an optical vision system for automated inspection of an object, the system comprising an image sensor configured to capture an image of the object, a controllable illumination assembly configured to illuminate the object, the illumination assembly comprising a plurality of individually controllable light sources positioned to surround the image sensor, and a control unit in electrical communication with and configured to operate the image sensor and the illumination assembly, wherein the computer program product comprises code for controlling the illumination assembly to illuminate the object with a predetermined illumination pattern based on a selected object type, code for acquiring a first image of the object using the image sensor, code for determining an illumination quality metric based on the first image, code for determining, if the determination of the illumination quality metric indicates that the illumination quality metric is below a predetermined threshold, an adapted illumination pattern based on the illumination quality metric, and code for controlling the illumination assembly to illuminate the object with the adapted illumination pattern. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
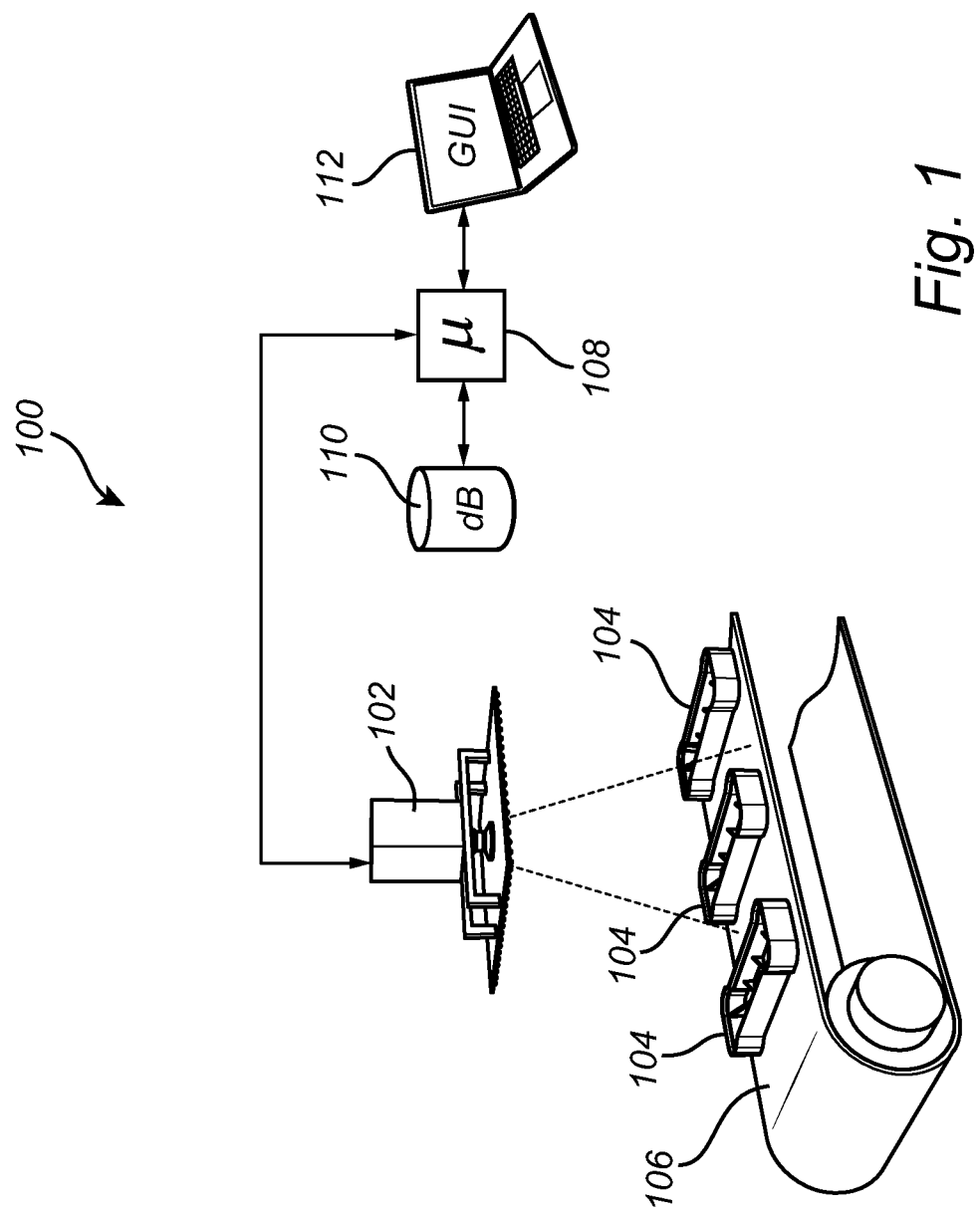
FIG. 1 conceptually exemplifies an optical inspection system according to the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Turning now to the drawings and to FIG. 1 in particular, there is schematically illustrated a conceptual optical inspection system 100 according to an embodiment of the present disclosure. The optical inspection system 100 comprises an imaging device 102, which typically comprises an image sensor and an onboard processor as well as a memory (not shown). The imaging device 102 also comprises a controllable illumination assembly as will be further discussed in relation to FIGS. 2A-2C.

The imaging device 102 is arranged to capture images (still or a video stream) of objects, such as machine parts 104, for example being transported at a conveyor 106. In the illustrated embodiment the conveyor 106 contains a plurality of objects, e.g. the exemplified machine parts 104. These objects pass, in turn, within the predetermined field of view (FOV) of the imagining device 102, so that their runtime images can be acquired and inspected for flaws (and/or other features of interest) during an inspection process.

The optical inspection system 100 further comprises a control unit 108 adapted to perform an automated optical inspection process based on the images (or video sequence) acquired by the imaging device 102. The control unit 108 is adapted to handle the operation of the imaging device 102. Such operation of the imaging device 102 may include the acquisition of the images/video sequence, as well as for dynamically repositioning the imaging device 102 in relation to the object 104. Repositioning of the imaging device 102 may as such include both horizontal and vertical reposition of the imaging device 102.

Possibly, the control unit 108 may also, optionally, be adapted to control or at least influence the control of the conveyor 106, for example for controlling a speed of the conveyor 104 in relation to passing the FOV of the imaging device 102.

The control unit 108 may include a general-purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The optical inspection system 100 further comprises a database 110 arranged in communication with the control unit 108, where the database may be configured to comprise data related to models or training images that may be used for performing the automated optical inspection process. That is, an image acquired by the imaging device 102 may be compared to such a model or training image for determining if e.g. flaws exists in relation to the objects to be inspected, such as e.g. the machine parts 104.

Figure 2A:
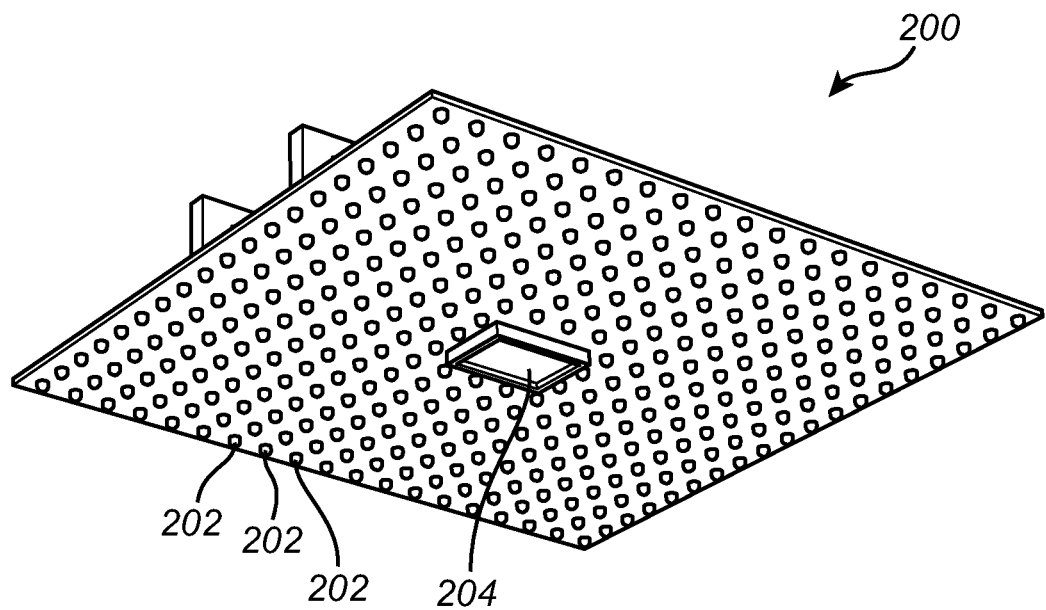
FIGS. 2A-2C show detailed views of different controllable illumination assemblies comprised with the optical inspection system shown in FIG. 1.

The optical inspection system 100 may also, optionally, comprise an interface for allowing e.g. an operator to interact with the optical inspection system 100. Such an interface may for example comprise a display unit 112 and optionally also e.g. a mouse and a keyboard (not shown). The display Turning now to FIGS. 2A-2C, conceptually illustrating the controllable illumination assembly to be used in relation to the imaging device 102, also forming part of the optical inspection system 100. In FIG. 2A a first exemplary embodiment of such a controllable illumination assembly 200 is shown. Specifically, the illumination assembly 200 comprises a plurality of light emitting diodes (LEDs) 202 arranged to surround the image sensor 204 comprised with the imaging device 102. In the illustrated embodiment the LEDs are arranged in a matrix formation (dashed lines) surrounding the image sensor 204. In FIG. 2A (as well as in the following FIG. 2B) the image sensor 204 is conceptually shown without an optical lens to be used together with the image sensor 204 in capturing images/video sequences of the object.

Figure 2B:
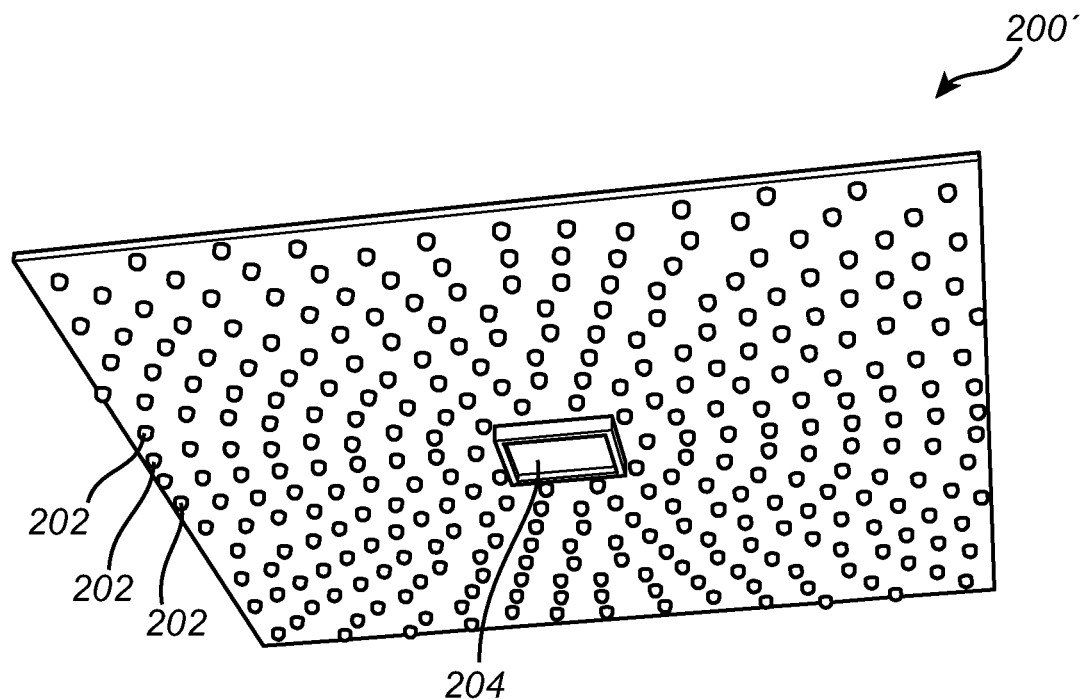

In an alternative embodiment, and as conceptually shown in FIG. 2B, the alternative illumination assembly 200' corresponds in function and form to the illumination assembly 200 as shown in FIG. 2A. However, the LEDs 202 are in this embodiment rather arranged in a circular (dashed lines) formation surrounding the image sensor 204. It may of course be possible to arrange the LEDs 202 differently, as compared to what is shown in any of FIGS. 2A and 2B.

Figure 2C:
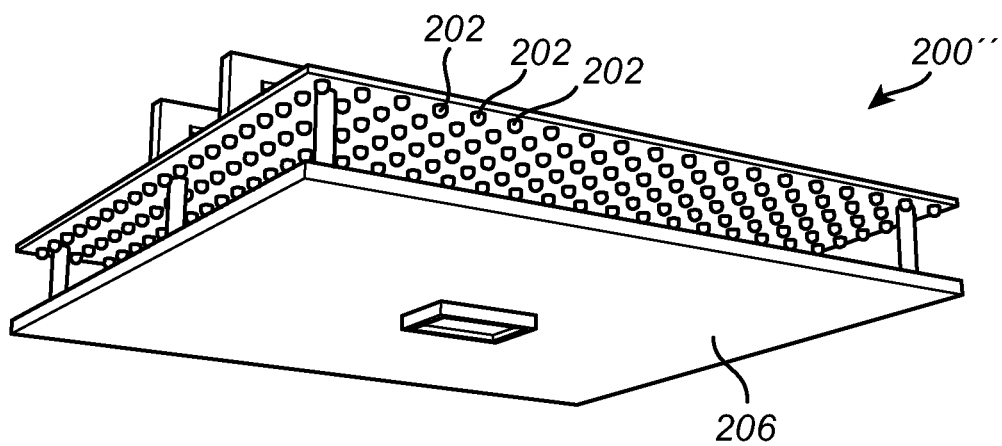

In a possible embodiment of the present disclosure, and as is conceptually shown in FIG. 2C, a further alternative illumination assembly 200" is optionally provided with an optical diffuser member 206. The optical diffuser member 206 is placed adjacent to the LEDs 202, between the LEDs 202 and the object 104 to be illuminated. The optical diffuser member 206 may be used for "spreading" light emitted from the individual LEDs 202, thereby providing a more homogeneous beam of light as seen from the further alternative illumination assembly 200". In some embodiments and in relation to some type of object such an implementation may be advantageous for improving the homogenous illumination of the object.

Figure 3A:
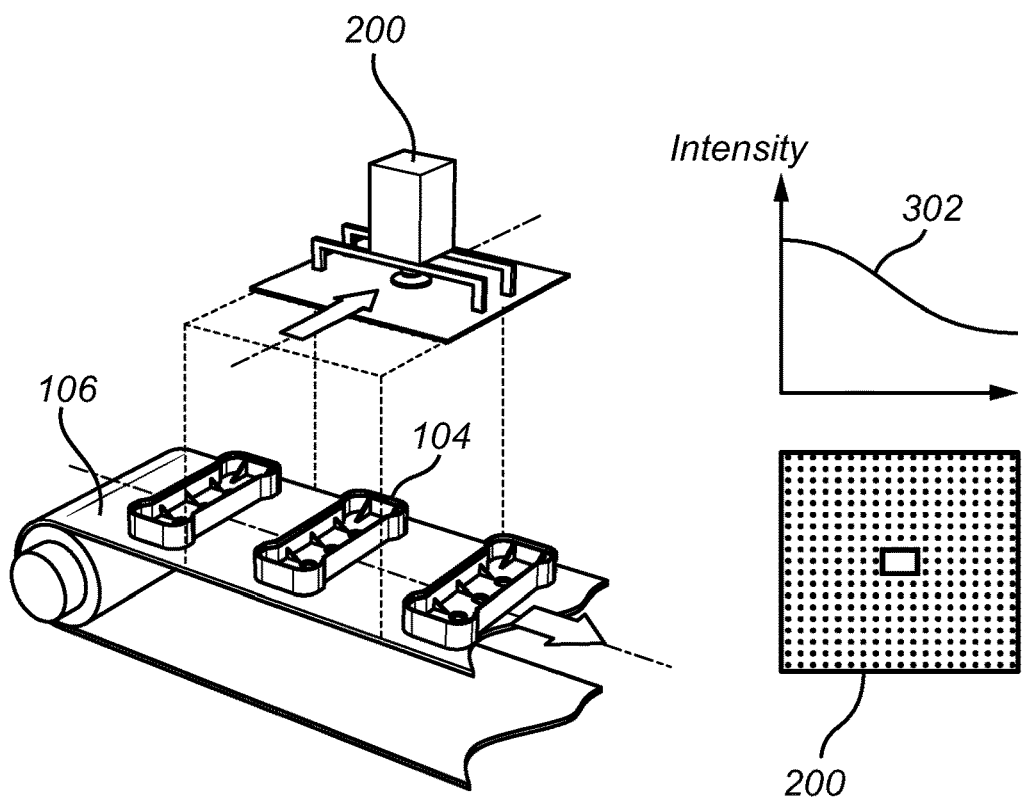
FIGS. 3A and 3B provides detailed embodiments of possible operational configurations of the illumination assembly.
Figure 3B:
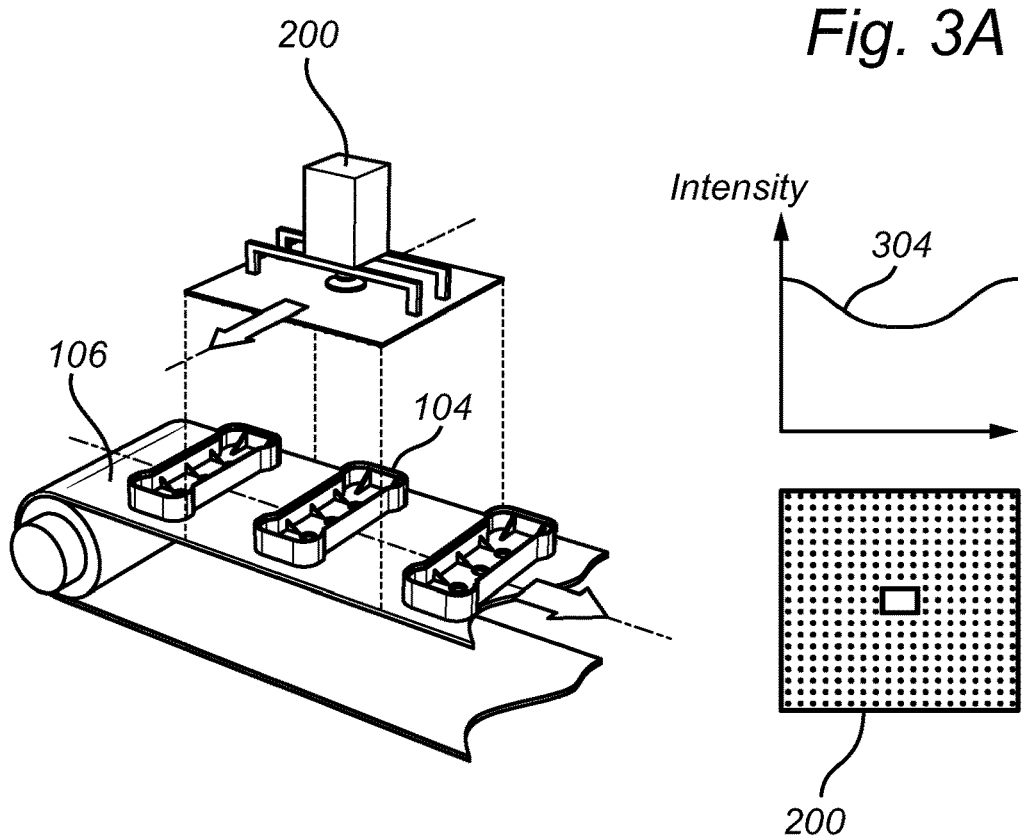

Turning now to FIGS. 3A and 3B, illustrating exemplary operations of the optical inspection system 100 when the imaging device 102 is dynamically repositioned in relation to the object 104. Specifically, in FIG. 3A the imaging device 102 is shows to be positioned somewhat to the left of the object (as seen from a center of the object) in a direction of the conveyor 106. In such a position it may be possible to allow the illumination assembly 200 (or equally 200'/200") to illuminate the object 104 with a specific illumination pattern, in the illustration shown in FIG. 3A show as a somewhat directional light, whereby an intensity level 302 as seen in relation to the illumination assembly 200 is allowed to be in comparison higher on the left hand side of the illumination assembly 200 as compared to the right hand side. Accordingly, individual control parameters for the LEDs of the illumination assembly 200 will control the LEDs 200 accordingly.

In FIG. 3B another example of position of the imaging device 102 in relation to the object 104 is presented. Specifically, in FIG. 3B the imaging device 102 is shows as being essentially above the object 104, thus essentially in line with the center of the object 104. In such a scenario it may for example (possibly dependent on the type of object) be possible to allow the illumination assembly 200 to illuminate the object using an alternative intensity level 304, whereby the intensity level for the LEDs 202 at the center of the illumination assembly 200 is decreased as compared to the LEDs 202 at the "edges" of the illumination assembly 200. As above, the individual control parameters for the LEDs of the illumination assembly 200 will control the LEDs 200 accordingly.

It should be understood that the intensity levels 302, 304 provided in relation to FIGS. 3A and 3B are exemplary, and may be formed differently, for example dependent on the type of object to be inspected, an external structure of the object, etc., as discussed above. Accordingly, in some embodiments e.g. the intensity level such as shown in FIG. 3A may be the opposite way around (i.e. higher towards the center of the object).

Figure 4:
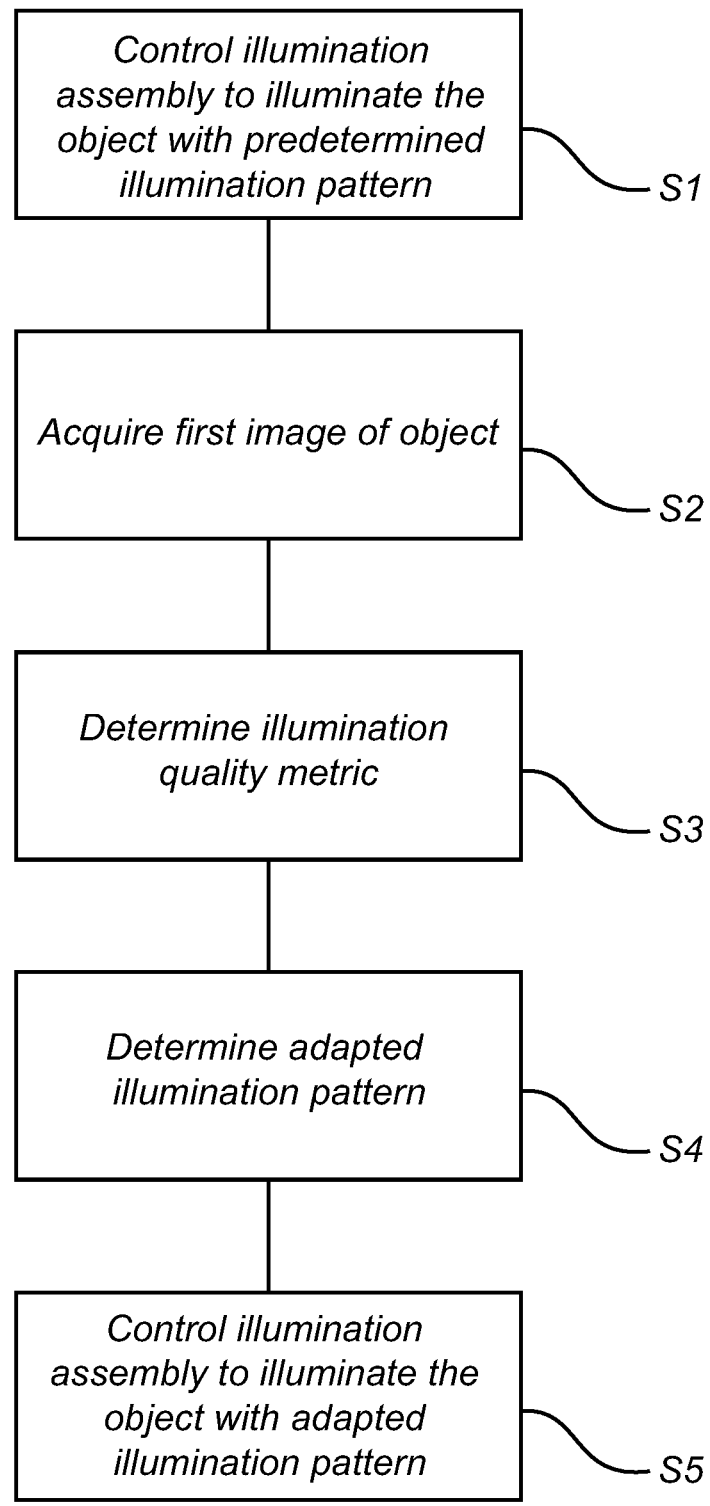
FIG. 4 illustrates the processing steps for performing the method according to the present disclosure.

In summary, with further reference to FIG. 4, the present disclosure relates an optical vision system 100 for automated inspection of an object 104 as well as to a method for operating such an optical vision system 100. In achieving a high quality image or video sequence to be used in a subsequent automated optical inspection process, the illumination assembly 200, 200', 200" is controlled, S1, to illuminate the object 104 with a predetermined illumination pattern based on a selected object type. The imaging device 102 will then acquire, S2, a first image or video sequence of the object 104. The control unit 108 comprised with the optical vision system 100 will then determine, S3, an illumination quality metric based on the acquired first image. The illumination quality metric is preferable adapted to determine a homogeneity of illumination at the object 104.

Subsequently, the control unit 108 will determine if the illumination quality metric is below or above a predetermined threshold. In case the illumination quality metric is below the predetermined threshold, then the control unit 108 determines, S4, an adapted illumination pattern based on the illumination quality metric. In a possible embodiment the illumination pattern is adjusted dependent on a result of the determination of the homogeneity of illumination at the object 104. That is, the result of homogeneity calculation may be taken into account when determining the adapted illumination pattern. The control unit 108 will then individually control, S5, the LEDs 202 to illuminate the object 104 with the adapted illumination pattern.

Advantages with the present disclosure includes the possibility of providing adequate illumination for different types of e.g. objects using the same type of illumination assembly, allowing an illumination pattern formed by such an illumination assembly may be adapted to match the object type.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

Variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality

The invention claimed is:

1. An optical vision system for automated inspection of an object, the system comprising:
    an imaging device comprising:
        an image sensor configured to capture an image of the object; and
        a controllable illumination assembly configured to illuminate the object, the illumination assembly comprising a plurality of individually controllable light sources positioned to surround the image sensor, and
    at least one processor in electrical communication with and configured to operate the imaging device and the illumination assembly, wherein the at least one processor is configured to automatically:
        control the illumination assembly to illuminate the object with a predetermined illumination pattern based on a selected object type;
        acquire a first image of the object using the image sensor;
        determine an illumination quality metric based on the first image;
        if the determination of the illumination quality metric indicates that the illumination quality metric is below a predetermined threshold, (i) dynamically reposition the imaging device in relation to the object, and (ii) determine an adapted illumination pattern based on the illumination quality metric and a relative position of the imaging device in relation to the object; and
        control the illumination assembly to illuminate the object with the adapted illumination pattern.

2. The optical vision system according to claim 1, wherein determining the image quality metric comprises determining a level of homogeneous light distribution throughout a selected field of view within the captured image.

3. The optical vision system according to claim 1, wherein determining the adapted illumination pattern comprises determining a level of accommodation with the Lambert's Cosine Law with respect to the object and the light illuminated by the illumination assembly.

4. The optical vision system according to claim 3, wherein the at least one processor is further configured to optimize the level of accommodation with the Lambert's Cosine Law with respect to the object and the light illuminated by the illumination assembly.

5. The optical vision system according to claim 1, wherein determining the adapted illumination pattern comprises determining a level of accommodation with the Inverse Square Law with respect to the object and the light illuminated by the illumination assembly.

6. The optical vision system according to claim 5, wherein the at least one processor is further configured to optimize the level of accommodation with the Inverse Square Law with respect to the object and the light illuminated by the illumination assembly.

7. The optical vision system according to claim 1, wherein each light source of the illumination assembly comprises at least one light emitting diode (LED).

8. The optical vision system according to claim 7, wherein each LED comprises an optical lens.

9. The optical vision system according to claim 1, wherein the at least one processor is further configured to:
    acquire a second image of the object using the image sensor, and
    determine an inspection parameter for the object.

10. The optical vision system according to claim 1, wherein the light sources of the illumination assembly are symmetrically arranged surrounding the image sensor.

11. The optical vision system according to claim 1, wherein the predetermined illumination pattern comprises control parameters for individually controlling the plurality of light sources of the illumination assembly.

12. The optical vision system according to claim 11, wherein the control parameters comprises at least an intensity level for each of the light sources of the illumination assembly.

13. The optical vision system according to claim 11, wherein the control parameters for individually controlling the plurality of light sources of the illumination assembly are pre-simulated for the specific type of object to be inspected.

14. A method for operating an optical vision system for automated inspection of an object, the system comprising:
    an imaging device comprising:
        an image sensor configured to capture an image of the object; and
        a controllable illumination assembly configured to illuminate the object, the illumination assembly comprising a plurality of individually controllable light sources positioned to surround the image sensor, and
    at least one processor in electrical communication with and configured to operate the imaging device and the illumination assembly, wherein the method comprises:

controlling the illumination assembly to illuminate the object with a predetermined illumination pattern based on a selected object type;

acquiring a first image of the object using the image sensor;

determining an illumination quality metric based on the first image;

if the determination of the illumination quality metric indicates that the illumination quality metric is below a predetermined threshold, (i) dynamically repositioning the imaging device in relation to the object, and (ii) determining an adapted illumination pattern based on the illumination quality metric and a relative position of the imaging device in relation to the object; and controlling the illumination assembly to illuminate the object with the adapted illumination pattern.

15. The method according to claim 14, wherein determining the image quality metric comprises determining a level of homogeneous light distribution throughout a selected field of view within the captured image.

16. The method according to claim 14, wherein the method comprises, prior to controlling the illumination assembly to illuminate the object with the predetermined illumination pattern:

simulating an illumination pattern for illumination of the object;

optimizing, in simulation, the illumination pattern for maximizing a level of homogeneous light distribution of the object, and selecting the predetermined illumination pattern.

17. The method according to claim 16, further comprising:

determining individual intensity control parameters for each of the light sources of the illumination assembly.

18. A computer program product comprising a non-transitory computer readable medium having stored thereon computer program means for operating an optical vision system for automated inspection of an object, the system comprising:

an imaging device comprising:
  an image sensor configured to capture an image of the object;
  a controllable illumination assembly configured to illuminate the object, the illumination assembly comprising a plurality of individually controllable light sources positioned to surround the image sensor, and at least one processor in electrical communication with and configured to operate the imaging device and the illumination assembly, wherein the computer program product comprises:

code for controlling the illumination assembly to illuminate the object with a predetermined illumination pattern based on a selected object type;

code for acquiring a first image of the object using the image sensor;

code for determining an illumination quality metric based on the first image;

code for, if the determination of the illumination quality metric indicates that the illumination quality metric is below a predetermined threshold, (i) dynamically repositioning the imaging device in relation to the object, and (ii) determining an adapted illumination pattern based on the illumination quality metric and a relative position of the imaging device in relation to the object; and code for controlling the illumination assembly to illuminate the object with the adapted illumination pattern.

* * * * *